United States Patent

Takamizawa et al.

Patent Number: 4,847,345
Date of Patent: Jul. 11, 1989

[54] PROCESS FOR MANUFACTURING ORGANIC SILAZANE POLYMERS AND CERAMICS THEREFROM

[75] Inventors: Minoru Takamizawa; Yoshihumi Takeda; Akira Hayashida; Tsutomu Takeno, all of Joetsu, Japan

[73] Assignee: Shin-Etsu Chemical Co., Ltd., Tokyo, Japan

[21] Appl. No.: 159,315

[22] Filed: Feb. 23, 1988

[30] Foreign Application Priority Data

Feb. 25, 1987 [JP] Japan .................. 62-43493

[51] Int. Cl.⁴ .................. C08G 77/60
[52] U.S. Cl. .................. 528/35; 528/34; 528/38; 528/28; 501/88; 501/97; 264/29.1; 264/29.2
[58] Field of Search .......... 528/35, 38, 34, 28; 501/88, 97; 264/29.2, 29.1

[56] References Cited

U.S. PATENT DOCUMENTS

| | | | |
|---|---|---|---|
| 4,340,619 | 7/1982 | Gaul, Jr. | 528/38 |
| 4,404,153 | 9/1983 | Gaul, Jr. | 528/38 |
| 4,535,007 | 8/1985 | Cannady | 525/474 |

Primary Examiner—Melvyn I. Marquis
Attorney, Agent, or Firm—Jules E. Goldberg

[57] ABSTRACT

A process for manufacturing an organic silazane polymer which comprises reacting an organic silicon compound of the following formula (I):

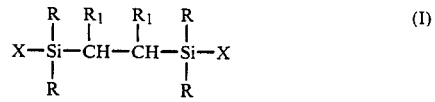

in which R represents hydrogen, chlorine, bromine, methyl radical, ethyl radical, phenyl radical or vinyl radical, $R_1$ represents hydrogen or methyl radical and X represents chlorine or bromine, or a mixture of organic silicon compounds of the formula (I) above and an organic silicon compound of the following formula (II):

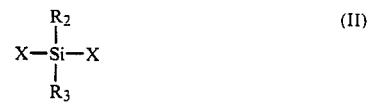

in which $R_2$ and $R_3$ represent hydrogen, chlorine, bromine, methyl radical, ethyl radical, phenyl radical or vinyl radical and X represents chlorine or bromine with a disilazane of the following formula (III):

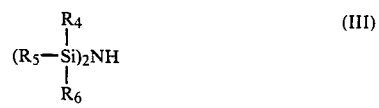

in which $R_4$, $R_5$, $R_6$ represents hydrogen, methyl radical, ethyl radical, phenyl radical or vinyl radical in an anhydrous state at a temperature of from 25° to 350° C. while distilling off by-produced organic ingredients out of the system to obtain an organic silazane polymer. The organic silazane polymer is useful for preceramic materials.

23 Claims, No Drawings

PROCESS FOR MANUFACTURING ORGANIC SILAZANE POLYMERS AND CERAMICS THEREFROM

BACKGROUND OF THE INVENTION

1. Field of the Invention

This invention relates to a process for manufacturing organic silazane polymers which are suitably used as precursors for ceramic materials and also to a process for manufacturing ceramics from the organic silazane polymers.

2. Description of the Prior Art

Great interest has been currently shown in ceramics as materials which are excellent in heat resistance, abrasion resistance, high-temperature strength and the like. However, because of the hardness and brittleness, ceramics are very difficult to process. For the manufacture of shaped ceramic articles, it is accordingly employed a method which comprises previously molding a fine powder of ceramic material into a desired form such as by compression, followed by sintering, or a precursor method in which an organic polymer, serving as a preceramic material, is melted or dissolved in a solvent, followed by fabrication into a desired form, and sintering to render the polymer inorganic. The prominent feature of the precursor method resides in that ceramic products of such complex forms as will never be obtained in the sintering method for fine powder can be obtained, i.e. products of specific forms such as fibers or sheets can be manufactured.

Among those materials generally referred to as ceramics, SiC and $Si_3N_4$ have attracted generally considerable attention because of the good characteristics thereof at high temperatures, e.g. SiC has a high heat resistance and a high-temperature strength and $Si_3N_4$ has a high thermal shock resistance and a high fracture toughness. Accordingly, there have been made various proposals on processes of producing $SiC$-$Si_3N_4$ ceramics and also on processes of producing organic silicon precursors according to the precursor method as is particularly shown (1) to (5) below. However, these proposed processes have still problems set forth below.

(1) In U.S. Pat. No. 3,853,567, there is disclosed a process of obtaining $SiC$-$Si_3N_4$ ceramics in which chlorosilanes and amines are reacted and subsequently heated at high temperatures to obtain carbosilazanes, followed by subjecting them to spinning and infusibilization and then sintering at high temperatures of from 800° to 2000° C. However, this process requires high temperatures of from 520° to 650° C. in order to obtain the carbosilazane, thus being very difficult to apply as an industrial process. In addition, the carbosilazanes are disadvantageous in that the yield of ceramic materials therefrom is as low as about 55%. Examples of this U.S. Patent specification used show only methyltrichlorosilane and dimethyldichlorosilane as the chlorosilanes and methylamine as the amine.

(2) U.S. Pat. No. 4,097,294 describes conversion of various silicon-containing polymers into ceramic materials by pyrolysis. However, it discloses only one example for the silazane polymer and the ceramic yield is as low as 12% in a maximum. Although this United States patent specification describes that ceramic materials may be formed into fibers or thin films, the formation is merely suggested as possible. In fact, there is made little or no reference to moldability and processability of polymers which are considered to be most important in the precursor method.

(3) There is shown production of silazane polymers, for example, by reaction between chlorodisilanes and disilazanes in Japanese Patent Laid Open No. Sho 57-117532 by reaction between chlorosilanes and disilazanes in Japanese Patent Laid Open No. Sho 57-139124, by reaction between chlorodisilanes and ammonia in Japanese Patent Laid Open No. Sho 58-63725 and by reaction between trichlorosilane and disilazanes in Japanese Patent Laid Open No. Sho 60-135431 respectively. Moreover, disclosures are also made for the production of silazane polymers by addition of meal halides to chlorosilanes and disilazanes in U.S. Pat. No. 4,535,007 and by addition of metal halides to chlorodisilanes and disilazanes as disclosed in Japanese Patent Laid Open No. Sho 60-208331 respectively. It is stated in each of these references that the silazane polymers mentioned above may be converted to ceramic materials by pyrolysis. However, the ceramic yields for all the silazane polymers are, at most, 50 to 60 wt. %. Similar to the patent specification shown in (2) above, none of the above references describes, in detail, the moldability and processability of the polymers, which are most important in the precursor method. In particular, most of the references mention nothing for ceramic fibers in examples, or do not refer to strength of ceramic fibers in case where examples of ceramic fibers are shown. Only in Japanese Patent Laid Open No. Sho 60-208331, there is a description of strength, but ceramic fibers having such a low tensile strength as of 53 Kg/mm² or 63 kg/mm² are obtained.

(4) In Japanese Patent Laid Open No. Sho 60-226890, there is described a process of preparing silazane polymers which comprises reacting ammonia with an organic silicon compound of the formula,

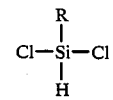

to obtain an ammonolysis product and subjecting the product to condensation by dehydrogenation with alkali metal or alkaline earth metal hydrides. It is stated that the polymers obtained in this process can be controlled in property depending on the degree of condensation by deprotonation and may take various forms of from oils to solids having no definite melting points. However, when a polymer melt is molded or processed to prepare, for example, a continuous fiber by melt spinning, it is necessary that the polymer have a certain degree of polymerization and be thermally stable. In the above process, however, the polymer obtained will be in the form of a solid which has not a melting point unless the polymerization is stopped on its way. In order to obtain a fusible polymer, the reaction time, reaction temperature, amounts of catalyst and solvent, etc. have to be controlled precisely but such a control may be very difficult and may not be usually reproducible. The polymers obtained by the process are not thermally stable with the disadvantage that gel-like substances are formed. In view of the above two problems, this process may not be considered to be suitable as an industrial process of manufacturing silazane polymers.

(5) Japanese Patent Laid-open No. Sho 60-228489 describes a process of preparing a silazane polymer which comprises producing a cyclic silazane from a compound of the formula:

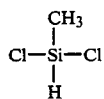

and monomethylamine, followed by reacting the cyclic silazane with ammonia. In this patent application, it is stated that the polymer is suitable as a material for chemical vapor deposition, but physical properties of the polymer are not described in detail. The ceramic yield is not indicated at all.

As will be apparent from the foregoing description, hitherto proposed silazane polymers, serving as preceramic materials, are not beneficial for industrial production. In addition, these polymers were found to be poor with respect to moldability and processability as precursors for ceramic fibers and poor in the ceramic yield as well. Ceramic products, e.g. ceramic fibers, obtained from the known preceramic polysilazane materials were found to have relatively poor physical properties such as strength, modulus of elasticity and the like.

SUMMARY OF THE INVENTION

It is therefore an object of the present invention to provide a process for manufacturing preceramic materials which is adapted for industrial production and which enables one to produce the preceramic materials having good moldability and processability in high ceramic yield.

It is another object of the invention to provide a process for manufacturing ceramics of high quality from the preceramic polymer materials.

Specifically, the present inventors have made an earnest study on the process of manufacturing $SiC-Si_3N_4$ type ceramics by the precursor method while taking notice of $SiC-Si_3N_4$ type ceramics having excellent high temperature characteristics of both of SiC and $Si_3N_4$ in order to develop a process for manufacturing ceramic products belonging to the precursor method and a process for manufacturing ceramic precursors excellent in the industrial property and workability suitably used for the manufacture of the ceramic products. As a result, the inventors have found that polysilazane polymers of high strength, excellent in heat stability and at a certain polymerization degree can be obtained by the process which comprises reacting an organic silicon compound of the following formula (I):

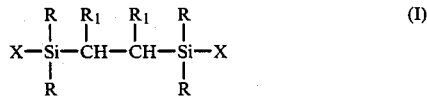

in which R represents hydrogen, chlorine, bromine, methyl radical, ethyl radical, phenyl radical or vinyl radical, $R_1$ represents hydrogen or methyl radical and X represents chlorine or bromine, or a mixture of an organic silicon compound of the formula (I) above and an organic silicon compound of the following formula (II):

in which $R_2$ and $R_3$ represent hydrogen, chlorine, bromine, methyl radical, ethyl radical, phenyl radical or vinyl radical and X represents chlorine and bromine with a disilazane of the following formula (III):

in which $R_4$, $R_5$, $R_6$ represents hydrogen, methyl radical, ethyl radical, phenyl radical or vinyl radical in an anhydrous state at a temperature of from 25° to 350° C. while distilling off by-produced organic ingredients out of the system to obtain an organic silazane polymer, as well as that ceramics mainly composed of SiC and $Si_3N_4$ at high quality can be obtained by melting and molding the thus obtained polysilazane polymer and then infusibilizing and sintering them by way of heating in air, electron beam irradiation, ultraviolet beam irradiation, etc.

Accordingly, the present invention provides a process for manufacturing an organic silazane polymer which comprise reacting an organic silicon compound represented by the formula (I) or a mixture of organic silicon compounds represented by the formulae (I) and (II) with disilazane of the formula (III) in an anhydrous atmosphere at a temperature of from 25° to 350° C. and distilling off the by-produced volatile ingredient out of the system, thereby obtaining an organic silazane polymer. Furthermore, the present invention also provides a process for manufacturing ceramics which comprises reacting an organic silicon compound represented by the formula (I) or a mixture of organic silicon compounds represented by the formulae (I) and (II) with a disilazane of the formula (III) in an anhydrous atmosphere at a temperature of from 25° to 350° C. and then distilling off the by-produced volatile ingredients out of the system thereby obtaining an organic silazane polymer, then melting and molding the organic silazane polymer and further infusibilizing the same followed by sintering to obtain ceramics.

In the manufacturing process for the organic silazane polymer according to the present invention, the organic silazane polymer excellent in the heat stability and having structural units not known so far can be obtained by merely using the organic silicon compound of the formula (I) or the mixture of the compounds of the formulae (I) and (II) as the starting material and reacting them with the disilazane of the formula (III) under an anhydrous atmosphere at a temperature of from 25° to 350° C. and then distilling off the by-produced volatile ingredients out of the system. Accordingly, it is possible to produce an organic silazane polymer at high quality excellent in the moldability and workability, satisfactory in handling property due to high strength and high flexibility, having excellent infusibility and high ceramic yield (usually of 70-80%) in an industrially easy way by the process according to the present invention.

Further, the present inventors have previously proposed a method of manufacturing an organic silazane polymer using ternary ingredient system of methyldichlorosilane, dimethyldichlorosilane and methyltrichlorosilane (U.S. patent application Ser. No. 903,409) or a process for producing an organic silazane polymer using ternary ingredient system of methyldichlorosilane, methyltrichlorosilane and an organic silicon compound represented by the following general formula (IV):

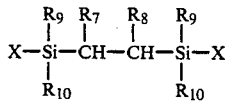

where $R_7$ and $R_8$ represent hydrogen or methyl radical, X represents chlorine or bromine, R represents chlorine, bromine, methyl radical, ethyl radical or phenyl radical and $R_{10}$ represents hydrogen, chlorine, bromine, methyl, ethyl or phenyl radical (U.S. patent application Ser. No. 114,111). As compared with these methods, the present invention is industrially advantageous in that the infusibility of the resultant organic silazane polymer is improved and the ceramics yield is increased by using the organic silicon compound of the formula (I) or the compounds of the formulae (I) and (II) and reacting the same with the silazane of the formula (III), as well as the handling property is excellent due to their high strength and high flexibility.

Moreover, in the manufacturing process of ceramics according to the present invention, since the organic silazane polymer is used as the precursor, ceramic products having excellent physical property, at stable quality and of adequate shape can easily be manufactured at a high yield.

The use of the organic silicon compound as the manufacturing starting material for the silazane polymer as the ceramic precursor has been known so far as described above. However, it is a novel finding of the present inventors to select one or more of the organic silicon compounds of the formulae (1) and (2) as described above for the organic silicon compounds, react them with the disilazane of the formula (3) described above under specific conditions and distillate the by-products out of the system, thereby obtaining silazane polymers of excellent properties not known so far. That is, it has found for the first time by the present inventors that a novel silazane polymer having a structure which is different from that of the known silazane obtained by using the prior art organic silicon compounds individually or as a mixture as described in U.S. Pat. Nos. 4,340,619, 4,312,970, 4,395,460 and 4,543,344, or U.S. patent application Ser. Nos. 903,409 and 114,111 as described above, and in which various repeating units and the coupling structures for the repeating units are mixed together, can be obtained by using the organic silicon compound of the formula (I) or the organic silicon compounds of the formulae (I) and (II) and preferably using the organic silicon compound of the formulae (I) and (II) at a ratio of 50-100 mol %:0-50 mol %. It has also found that the silazane polymer has more excellent infusibility and has higher strength and flexibility when used as the ceramic precursor as compared with the known organic silazane polymer obtained by using the prior art organic silicon compound as described above individually or in a mixture and that the ceramic of stable quality remarkably improved with the ceramic yield and with physical properties such as tensile strength, modulus of elasticity, etc. is obtained by using the silazane polymer having the novel structure different from the conventional silazane polymer structure and having excellent property as compared with the manufacturing process of ceramics by the precursor method in the prior art.

DETAILED DESCRIPTION OF THE INVENTION

In the method of manufacturing the organic silazane polymer according to the present invention, the organic silicon compound of the formula (I) is used, or the organic silicon compounds of the formulae (I) and (II) are used in admixture as the starting material. In this case, it is preferred that the compounds of the formula (I) and the formula (II) are mixed in such a ratio as 50-100 mol %:0-50 mol %, more preferably 70-100 mol %:10-50 mol %, of (I):(II). If the ratio is deviated from the above-mentioned composition, the strength of the resultant silazane polymer may often lack in the flexibility and, in the case of obtaining fibrous products by spinning after the melting of the silazane polymer, it may cause thread breakage upon various handlings such as take-up or subsequent step thereby possibly reducing the yield up to the final step or degrading the physical property of the final products.

In this case, the compound of the formula (I) can include, for example: $ClH_2SiCH_2CH_2SiH_2Cl$, $Cl_2HSiCH_2CH_2SiHCl_2$, $Cl_3SiCH_2CH_2SiCl_3$, $Cl(CH_3)_2SiCH_2CH_2Si(CH_3)_2Cl$, $Cl_2(CH_3)SiCH_2CH_2Si(CH_3)Cl_2$, $Cl(CH_3)_2SiCH(CH_3)CH(CH_3)Si(CH_3)_2Cl$, and $Cl_2(CH_2=CH)SiCH_2CH_2Si(CH=CH_2)Cl_2$.

Among them, 1,2-bis(chlorodimethylsilyl) ethane, 1,2-bis(dichloromethylsilyl) ethane, and 1,2-bis(trichlorosilyl) ethane are preferably used.

Further, the compound of the formula (II) can include, for example: $H_2SiCl_2$, $HSiCl_3$, $SiCl_4$, $CH_3SiCl_3$, $(CH_3)_2SiCl_2$, $(C_2H_5)SiCl_3$, $(C_2H_5)_2SiCl_2$, $C_6H_5SiCl_3$, $(C_6H_5)_2SiCl_2$, $CH_2=CHSiCl_3$, $(CH_2=CH)_2SiCl_2$, and $(CH_2=CH)(CH_3)SiCl_2$.

The compounds of the formulae (I) and (II) may be used singly among the compounds as described above or in a multi-ingredient system by blending two or more of them together.

Furthermore, in the present invention, the disilazane of the formula (III) is reacted with the organic silicon compound described above.

The disilazane of the formula (III) may be blended in an equi-molar or more amount, more preferably up to three times molar as expressed by molar amount based on the amount of halogen in the organic silicon compounds of the formulae (I) and (II). The silazane compound of the formula (III) can include, specifically: $(H_3Si)_2NH$, $\{H_2(CH_3)Si\}_2NH$, $\{H(CH_3)_2Si\}_2NH$, $\{(CH_3)_3Si\}_2NH$, $\{(C_2H_5)_3Si\}_2NH$, $\{C_6H_5)_3Si\}_2NH$, $\{CH_2=CH(CH_3)_2Si\}_2NH$, $\{CH_2=CH(C_6H_5)_2Si\}_2NH$, and $\{CH_2=CH(C_2H_5)_2Si\}NH$.

One or more of them may be used.

Furthermore, in the present invention, in the case of reacting the organic silicon compound of the formula (I) or the organic silicon compounds of the formulae (I) and (II) with the disilazane of the formula (III), the reaction is carried out in an anhydrous atmosphere under the temperature condition of from 25° to 350° C. and distilling off the by-produced volatile ingredients out of the system. By conducting the reaction under such reaction conditions, the silazane polymer of the aimed shape can be obtained in various forms such as from oil to solid forms and, moreover, a silazane polymer having suitable polymerization degree and excellent heat stability as ceramic fiber precursors can be obtained.

In this case, while the organic silicon compound or silazane may be dissolved in a solvent such as hexane, benzene, toluene, tetrahydrofuran and the like, it is usually preferred to react in a non-solvent state. The reaction condition is from 25° to 350° C. and, preferably, from 150° to 320° C. in an anhydrous atmosphere. If the reaction temperature is lower than 25° C., the reaction does not proceed, whereas if it is higher than 350° C., the reaction rate is too rapid to adjust the silazane polymer to a desired polymerization degree.

When the disilazane is reacted in this way to the organic silicon compound, the following reaction schemes A and B occur succeedingly.

Reaction scheme A

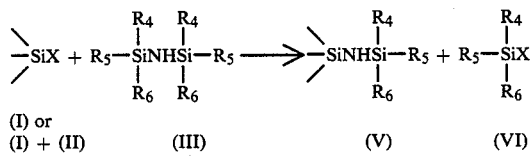

Reaction scheme B

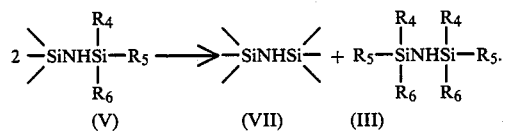

That is, as shown in the reaction scheme A, the organic silicon compounds of the formula (I) or (I) and (II) are reacted with the disilazane of the formula (III) to produce the compound of the formula (V) and the volatile compound of the formula (VI) as the by-product. Among them, the by-product of the formula (VI) is distilled out of the system under ambient or reduced pressure along with the progress of the reaction. Further successively, the condensating reaction of the compound of the formula (V) starts to occur along with the elevation of the temperature as shown in the reaction scheme B, to produce an aimed silazane polymer (formula (VII)) of higher molecular weight. Further, the disilazane of the formula (III) by-produced together with the silazane polymer of the formula (VII) is distilled out of the systems in the same manner as the by-product of the formula (VI) under the normal or reduced pressure distillation and can be used again.

The degree of polymerization and melting point of the silazane polymer can be suitably controlled by changing the mixing ratios of the above organic silicon compounds, reaction temperature, reaction time, etc. and viscosity, melting point, etc. can be controlled by distilling off the oligomer of relatively low molecular weight.

The organic silazane polymers obtained in this manner have high moldability and processability and, accordingly, can be shaped, as preceramic materials, into suitable forms such as fibers or sheets. In addition, the polymers may be used as binders or adhesives.

In the process of manufacturing ceramics according to the invention, the organic silazane polymers are melted, molded, infusibilized and finally sintered. For this purpose, the polymer should preferably have a melting point of from 60° to 250° C. and a molecular weight of 800 to 3,000 (cryoscopic method using benzene). Furthermore, while the organic silazane polymer obtained by the reaction described above may be used as it is for the melting and molding, it is preferred to dissolve the silazane polymer in an organic solvent such as hexane, benzene, toluene, tetrahydrofuran, etc. and distill off the solvent under a reduced pressure after filteration or to filter the hot melt liquid as it is to remove insoluble matter. With such treatment, the silazane polymer having the melting point and the molecular weight as described above can be obtained more reliably to conduct the melting and molding of the polymer easily.

The manner of melting, shaping and sintering of the organic silazane polymers are not critical, but the polymers are molded as desired and sintered to obtain ceramic products of desired forms.

For instance, when ceramic fibers are fabricated, the organic silazane polymer is at first heated to melt and spun by melt spinning. The spinning temperature may vary depending on the melting point of the polymer, and is favorably in the range of from 100° to 300° C.

Next, the thread-like material obtained by the spinning step is infusibilized by heating in air or irradiation with electron beams in vacuum or in $N_2$ gas, or optically infusibilized by irradiation of ultraviolet beams in an inert atmosphere such as $N_2$ or Ar gas. In this step, the heating in air is preferably effected at a temperature lower than the melting point, for example, within a temperature range of from 50° to 200° C. In this case, no infusibilization occurs if the temperature is lower than 50° C., whereas the polymer may possibly be melted if it is higher than 200° C. The electron beam irradiating is preferably at an exposed dose of from 10 to 2,000 Mrad in vacuum or $N_2$ gas atmosphere. If it is less than 10 Mrad, fibers may sometime fuse each other upon sintering. The ultraviolet irradiation may be carried out by using a commercially available ultraviolet lamp having a wave length of 250 to 400 nm. The light volume of the ultraviolet can be adjusted by selecting the intensity of the light source, the irradiating distance and the irradiating time depending on the infusible property of the organic silazane polymer used. The organic silazane polymers suitably infusibilized optically by the ultraviolet irradiation is those obtained by using the compound (II) having a comparatively large amount of vinyl radical as the substituent radical $R_2$. However, the organic silazane polymer having a small amount of vinyl radical can also be optically infusibilized by the ultraviolet irradiation if photosensitizer, vulcanizer, etc. is added to the organic silazane polymer. The blending amount of photosensitizer or vulcanizer may preferably be about 0.001 to 5% by weight of the polymer since addition of great amount may give influence on the properties of the resultant polymer. If the addition amount is less than 0.001% by weight, fusion may sometime occur. Examples of the photosensitizer include benzophenone, rosebengal and acetophenone. Examples of the vulcanizer include diphenyl disulfide, 1,3-benzenedithiol and 2,2'-dithiobis (benzothiazole). The thus infusibilized thread-like material is sintered at high temperatures in a tension-free or tensioned condition, thereby obtaining ceramic fibers composed mainly of SiC and $Si_3N_3$ and having good strength and modulus of elasticity. In this step, the sintering is preferably effected in vacuum or in an atmosphere of one or more of gases, such as an inert gas including Ar, etc., N₂, H₂, NH₃ and the like, at a temperature of from 700° to 2,000° C., preferably from 700° to 1,500° C. The sintering under tension is more preferable, by which there can be obtained ceramic fibers of high quality having a tensile strength of from 230 to 310 kg/mm² and a modulus of elasticity of from 16 to 30 tons/mm².

In the sintering, if the organic silazane polymer is added as a binding agent to one or more kinds of powder of an inorganic compound selected from the group consisting of alumina, silicon carbide, silicon nitride and boron nitride, a ceramic molding product of high quality can be obtained easily.

As has been described above, the organic silazane polymers can be conveniently produced industrially according to the process of the invention. The silazane polymers are thermally stable and have a desired degree of polymerization, with good moldability and processability. The polymers can provide high ceramic yield because of excellent infusibility and high strength and flexibility and, thus, are very suitable for use as preceramic materials for ceramic fibers.

On the other hand, according to the process of manufacturing ceramics of the present invention, ceramics of high quality composed mainly of SiC and Si₃N₄ can be obtained at high ceramic yield. Ceramic products of desired forms such as ceramic fibers, ceramic sheets and ceramic molding products having high infusibility, high strength and high modulus of elasticity can be obtained easily by the process of the invention.

The present invention is more particularly described by way of examples and comparative example, but these examples should not be construed as limiting the present invention.

(EXAMPLE)

Polymerization step (1)

(1,2-bis(methyldichlorosilyl) ethane 100 mole %)

A dried 500 ml four-necked flask equipped with a stirrer, a thermometer, a gas inlet tube and a distillation device was charged with 76.8 g (0.3 mol) of 1,2-bis(methyldichlorosilyl) ethane and 177.5 g (1.1 mol) of ((CH₃)₃Si)₂NH. Then, mixture was gradually heated under the N₂ atmosphere (the reflux was started upon the vessel temperature reached 92° C. and the temperature of the steam was 59° C.), and the reaction temperature was gradually elevated to 300° C. while distilling the resulting evaporizable ingredient out of the system and then maintained at that temperature (300° C.) for 3 hours. Under the N₂ gas stream, the reaction product was cooled to the room temperature and, after adding 100 ml of anhydrous hexane to the reaction product to dissolve and filter the insoluble matter, the hexane and low molecular weight product were stripped under 10 mmHg at 200° C. 59 g of the residue was obtained as a glass-like yellow solid polymer. It had a molecular weight of 2,650 (benzene cryoscoping depressant method here and hereinafter) and 130° C. of melting point, and the residual chlorine was less than 100 ppm from the potentiometric titration. Further, IR analysis showed absorption of NH at 3,400 cm⁻¹, CH at 2,980 cm⁻¹ and SiCH₃ at 1,260 cm⁻¹ respectively.

Polymerization step (2)

(1,2-bis(methyldichlorosilyl) ethane:methyldichlorosilane=80:20 (mol %))

In the same manner as in the polymerization step (1), 61.4 g (0.24 mol) of 1,2-bis(methyldichlorosilyl) ethane, 6.9 g (0.06 mol) of methyldichlorosilane and 177.5 g (1.1 mol) of ((CH₃)₃Si)₂NH were charged in a 500 ml four-necked flask and reacted at a reaction temperature of 300° C. for one hour, cooled and then treated in the same manner as described above. 53 g of pale yellow solid was obtained, which had a molecular weight of 2,100 and melting point of 82° C.

Polymerization step (3)

(1,2-bis(methyldichlorosilyl) ethane:methyltrichlorosilane=70:30 (mol %))

In the same manner as in the polymerization step (1), 53.8 g (0.24 mol) of 1,2-bis(methyldichlorosilyl) ethane, 13.4 g (0.06 mol) of methyltrichlorosilane and 194 g (1.2 mol) of ((CH₃)₃Si)₂NH were charged in a 500 ml four-necked flask and reacted at a reaction temperature of 280° C. for 30 min., cooled and then treated. 43.7 g of pale yellow solid was obtained, which had a molecular weight of 1,800 and melting point of 70° C.

Polymerization step (4)

(1,2-bis(methyldichlorosilyl) ethane:vinyltrichlorosilane=70:30 (mol %))

In the same manner as in the polymerization step (1), 125.4 g (0.49 mol) of 1,2-bis(methyldichlorosilyl) ethane, 33.9 g (0.21 mol) of vinyltrichlorosilane and 258.2 g (1.6 mol) of ((CH₃)₃Si)₂NH were charged in a 1 liter four-necked flask and reacted at a reaction temperature of 250° C. for 3 hours, cooled and then treated. 103.5 g of pale yellow solid was obtained, which had a molecular weight of 3,100 and melting point of 110° C. The IR analysis showed absorptions of NH at 3,400 cm⁻¹, C-H at 2,950 cm⁻¹, Si-Me at 1,260 cm⁻¹ and CH₂=CH— at 1,420 cm⁻¹ respectively.

Polymerization step (5)

(1,2-bis(trichlorosilyl) ethane:methyldichlorosilane:methylvinyldichlorosilane=50:25:25 (mol %))

In the same manner as in the polymerization step (1), 44.6 g (0.15 mol) of 1,2-bis(trichlorosilyl) ethane, 8.6 g (0.075 mol) of methyldichlorosilane, 10.6 g (0.075 mol) of methylvinyldichlorosilane and 129 g (0.8 mol) of ((CH₃)₃Si)₂NH were charged in a 500 ml four-necked flask and reacted at a reaction temperature of 260° C. for 2 hours. 45 g of pale yellow solid was obtained, which had a molecular weight of 2,720 and melting point of 125° C. The IR analysis showed absorption of NH at 3,400 cm⁻¹ C-H at 2,950 cm⁻¹, Si-H at 2,150 cm⁻¹, Si-Me at 1,260 cm⁻¹ and CH₂=CH— at 1,420 cm⁻¹ respectively.

Polymerization step (6)

(1,2-bis(methyldichlorosilyl)ethane:vinyltrichlorosilane=98:2 (mol %))

In the same manner as in the polymerization step (1), 75.3 g (0.294 mol) of 1,2-bis(methyldichlorosilyl) ethane, 0.9 g (0.06 mol) of vinyltrichlorosilane and 218.9 g (1.356 mol) of ((CH₃)₃Si)₂NH were charged in a 500 ml four-necked flask and reacted at a reaction temperature of 240° C. for 1.5 hours. 57 g of white solid was obtained, which had a molecular weight of 2,250 and melting point of 86° C. The IR analysis showed absorptions of NH at 3,400 cm⁻¹, C-H at 2,950 cm⁻¹, CH₂=CH— at 1,420 cm⁻¹ and Si-Me at 1,260 cm⁻¹ respectively.

Polymerization step (7)

(1,2-bis(methyldichlorosilyl) ethane:1,2-bis(trichlorosilyl) ethane:vinyltrichlorosilane=50:20:30 (mol %))

In the same manner as in the polymerization step (1), 38.4 g (0.15 mol) of 1,2-bis(methyldichlorosilyl) ethane, 17.8 g (0.06 mol) of 1,2-bis(trichlorosilyl) ethane and 13.5 g (0.09 mol) of vinyltrichlorosilane and 184 g (1.14 mol) of $((CH_3)_3Si)_2NH$ were charged in a 500 ml four-necked flask and reacted at a reaction temperature of 250° C. for 2 hours. 49 g of white solid was obtained, which had a molecular weight of 4,200 and melting point of 220° C. The IR analysis showed absorptions of NH at 3,400 cm$^{-1}$, C-H at 2,950 cm$^{-1}$, $CH_2=CH-$ at 1,420 cm$^{-1}$ and Si-Me at 1,260 cm$^{-1}$ respectively.

Fiber preparation step (1)

30 g of the silazane polymer obtained in the polymerization step (1) was melt-spun at 190° C. by the use of a mono-hole melt spinning apparatus. The spinning was carried out very satisfactorily even after 3 hours and was performed at a take-up speed of 400 m/min. The resulting green thread was so strong as could not be experienced so far and had a tensile strength of 10 kg/mm when measured. Then, the resultant green thread was subjected to infusibilization treatment by electron beams at 2000 Mrad. Then, the thread was sintered under a slight tension in an $N_2$ gas stream at a temperature rising rate of 100° C./Hr at 1,100° C. for 30 minutes. The ceramic yield was 72%, and the resulting fiber had a fiber diameter of 8 μm, tensile strength of 270 kg/mm$^2$ and a modulus of elasticity of 18 t/mm$^2$. Further, when fiber composition was analyzed by the elementary analysis, it was confirmed to be fibers mainly composed of SiC-Si$_3$N$_4$ comprising 58.8% Si, 25.8% C, 15.2% N and 0.2% O.

Fiber preparation step (2)

20 g of the silazane polymer obtained in the polymerization step (2) was melt-spun at 140° C. by the use of the same melt-spinning apparatus as in the fiber preparation step (1). The take-up speed was 420 m/min and the spinning was carried out extremely satisfactorily. Further, the resultant green thread was subjected to infusibilizing treatment in an electron beam device at 500 Mrad. Then, it was sintered in a tension-free condition in $N_2$ gas stream at a temperature rising rate of 100° C./Hr at 1,200° C. for 30 min. The ceramic yield was 70%, and the fibers had a fiber diameter of 7 μm, a tensile strength of 280 kg/mm$^2$ modulus of elasticity of 20 t/mm$^2$. When the elementary analysis was carried out for the fiber composition, it was fibers mainly composed of SiC-Si$_3$N$_4$

Fiber preparation step (3)

20 g of the silazane polymer obtained in the polymerization step (3) was melt-spun at 130° C. by the use of the same melt-spinning apparatus as in the fiber preparation step (1). The take-up speed was 450 m/min and the spinning was carried out extremely satisfactorily. Further, the resultant green thread was subjected to infusibilizing treatment in air by heating at 50°–80° C. (5° C./Hr). Then, it was sintered under a slight tension in $N_2$ gas stream at a temperature rising rate of 100° C./Hr at 1,150° C. for 30 min. The ceramic yield was 68%, and the fiber were mainly composed of SiC-Si$_3$N$_4$ having a fiber diameter of 6 μm, a tensile strength of 230 kg/mm$^2$ and a modulus of elasticity of 19 t/mm$^2$.

Fiber preparation step (4)

30 g of the silazane polymer obtained in the polymerization step (4) was incorporated with 0.06 g of rose bengal as a photosensitizer and after dissolving and mixing with tetrahydrofuran, tetrahydrofuran was removed at 100° C. under the reduced pressure of 5 mmHg. Then, melt-spinning was carried out by using the same spinning apparatus as in the fiber preparation step (1) above at 170° C. and at a take-up speed of 420 m/min. The resultant green thread was infusibilized under a slight tension in $N_2$ gas stream using a ultraviolet beam irradiation device (mercury lamp H-400P for photochemical use, manufactured by Toshiba) and applied with photoirradiation from 15 cm distance. Then, the resultant fibers were sintered under a tension in $N_2$ gas stream at a temperature rising rate of 100° C./Hr at 1,200° C. for 1 hour. The ceramic yield was 74% and the fiber was mainly composed of SiC-Si$_3$N$_4$ having a fiber diameter of 7 μm, tensile strength of 250 kg/mm$^2$ and modulus of elasticity of 23 t/mm$^2$.

Fiber preparation step (5)

30 g of the silazane polymer obtained in the polymerization step (5) was incorporated with 0.06 g of diphenyldisulfide as a vulcanizing agent and after dissolving and mixing into tetrahydrofuran, tetrahydrofuran was distilled off under a reduced pressure of 5 mmHg at 100° C. Then, melt-spinning was carried out using the same spinning apparatus as in the fiber preparation step (1). The resultant green thread was subjected to infusibilization by photoirradiation using the same ultraviolet device as in the fiber preparation step (4). Then, the resultant fiber was sintered under tension in an $N_2$ gas stream at a temperature rising rat of 100° C./Hr at 1100° C. for 30 minutes. The ceramic yield was 668% and the fiber was mainly composed of SiC-Si$_3$N$_4$ having a fiber diameter of 8 μm, a tensile strength of 235 kg/mm$^2$ and a modulus of elasticity of 20.5 t/mm$^2$.

Fiber preparation step (6)

30 g of the silazane polymer obtained in the polymerization step (6) was incorporated with 3 mg of 1,3-benzene dithiol as a vulcanizing agent and 3 mg of benzophenone as a photosensitizer after dissolving and mixing into tetrahydrofuran, tetrahydrofuran was distilled off under a reduced pressure and melt-spinning was carried out at 170° C. using the same spinning apparatus as in the fiber preparation step (1). The resultant green thread was subjected to optical infusibilization by photoirradiation using the same ultraviolet device as in the fiber preparation step (4). Then, the resultant fiber was sintered under tension in an $N_2$ as stream at a temperature rising rate of 100° C./Hr at 1,100° C. for 30 minutes. The ceramic yield was 70% and the fiber was mainly composed of SiC-Si$_3$N$_4$ having a fiber diameter of 9 μm, a tensile strength of 260 kg/mm$^2$ and a modulus of elasticity of 20 t/mm$^2$.

Ceramic molding products 0.5 g of the silazane polymer obtained in the polymerization step (7), 10 g of fine SiC powder and 2 g of hexane were dispersed and kneaded and then hexane was distilled off. The powder was press-molded under the molding pressure of 1,000 kg/cm$^2$, thereby obtaining a powder-pressed molding product having a diameter of 25 mm and a thickness of 10 mm. Then, the powder-pressed molding product was heated up in an argon atmosphere from the room temperature to 1,000° C. for 2 hours, from 1,000° C. to 1,950° C. for 1 hour, maintained at 1,950° C. for 30 min. and then cooled, to obtain SiC molding product having a density of 2.85 g/cm$^2$ and a bending strength of 30 kg/mm$^2$.

(COMPARATIVE EXAMPLE)

Polymerization step

A 500 ml dried four-necked flask equipped with a stirrer, a thermometer, a gas inlet tube and a distillation device was charged with 35.8 g (10.24 mol) of methyltrichlorosilane, 7.7 g (0.06 mol) of dimethyldichlorosilane and 137.2 g (0.85 mol) of $((CH_3)_3Si)_2NH$. Then, after reacting in the same procedures as in the polymerization step (1) of the above mentioned example, at 270° C. for 30 min., it was cooled to the room temperature. 21 g of blue yellow solid was obtained and it had a molecular weight of 1,700 and melting point of 65° C.

Fiber preparation step 21 g of the resultant silazane polymer was charged into a mono-hole (nozzle diameter: 0.5 mm) spinning apparatus and melt-spun at 120° C. under N$_2$ gas stream. Thread breakage occurred frequently and the resultant green thread was extremely weak and, when the strength thereof was measured, it was 0.5 kg/mm$^2$. Then, green thread was infusibilized by using an electron beam apparatus at 2,000 Mrad and sintered under N$_2$ gas stream at 1,100° C. for 30 minutes with the temperature rising rate of 100° C./Hr. The ceramic yield was 48% and the resultant fibers were partially fused to each other. When the physical properties of the not-fused fibers were measured, they showed extremely low physical property such as fiber diameter of 8 μm, tensile strength of 20 kg/mm$^2$ and modulus of elasticity of 4 t/mm$^2$.

What is claimed is:

1. A process for manufacturing an organic silazane polymer which comprises reacting an organic silicon compound of the following formula (I):

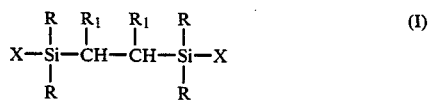

in which R represents hydrogen, chlorine, bromine, methyl radical, ethyl radical, phenyl radical or vinyl radical, R$_1$ represents hydrogen or methyl radical and X represents chlorine or bromine, or a mixture of an organic silicon compound of the formula (I) above and an organic silicon compound of the following formula (II):

in which R$_2$ and R$_3$ represent hydrogen, chlorine, bromine, methyl radical, ethyl radical, phenyl radical or vinyl radical and X represents chlorine or bromine with a disilazane of the following formula (III):

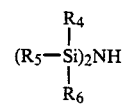

in which R$_4$, R$_5$, R$_6$ represents hydrogen, methyl radical, ethyl radical, phenyl radical or vinyl radical in an anhydrous state at a temperature of from 25° to 350° C. while distilling off by-produced organic ingredients out of the system to obtain an organic silazane polymer.

2. A manufacturing process according to claim 1, wherein the mixing ratio of the organic silicon compounds shown by the above formulae (I) and (II) is in the range of 50-100 mol %:0-50 mol %.

3. A manufacturing process according to claim 1, wherein the organic silicon compound of the formula (I) is 1,2-bis(chlorodimethylsilyl) ethane.

4. A manufacturing process according to claim 1, wherein the organic silicon compound of the formula (I) is 1,2-bis(dichloromethylsilyl) ethane.

5. A manufacturing process according to claim 1, wherein the organic silicon compound of the formula (I) is 1,2-bis(trichlorosilyl) ethane.

6. A process for manufacturing ceramic material which comprises reacting an organic silicon compound of the following formula (I):

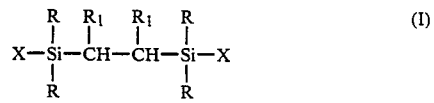

in which R represents hydrogen, chlorine, bromine, methyl radical, ethyl radical, phenyl radical or vinyl radical, R$_1$ represents hydrogen or methyl radical and X represents chlorine or bromine, or a mixture of organic silicon compounds of the formula (I) above and an organic silicon compound of the following formula (II):

in which R$_2$ and R$_3$ represent hydrogen, chlorine, bromine, methyl radical, ethyl radical, phenyl radical or vinyl radical and X represents chlorine or bromine with a disilazane of the following formula (III):

in which R$_4$, R$_5$, R$_6$ represents hydrogen, methyl radical, ethyl radical, phenyl radical or vinyl radical in an anhydrous state at a temperature of from 25° to 350° C. while distilling off by-produced organic ingredients out of the system to obtain an organic silazane polymer, melting, molding and infusibilizing the organic silazane polymer, and sintering the same to obtain a ceramic material.

7. A manufacturing process according to claim 6, wherein the mixing ratio of the organic silicon compounds shown by the above formulae (I) and (II) is in the range of 50-100 mol %:0-50 mol %.

8. A manufacturing process according to claim 6, wherein the organic silazane polymer has a melting point of from 60° to 250° C.

9. A manufacturing process according to claim 6, wherein the organic silazane polymer is melted, molded and infusibilized in air by heating at a temperature of from 50° to 200° C.

10. A manufacturing process according to claim 6, wherein the organic silazane polymer is melted, molded and infusibilized in vacuum or in $N_2$ gas by irradiation of electron beams at an exposed dose of from 10 to 2000 Mrad.

11. A manufacturing process according to claim 6, wherein the organic silazane polymer is melted, molded and infusibilized in an inert atmosphere by irradiation of ultraviolet beams.

12. A manufacturing process according to claim 11, wherein a photosensitizer is added to the organic silazane polymer before irradiation of the ultraviolet beams.

13. A manufacturing process according to claim 11, wherein a vulcanizer is added to the organic silazane polymer before irradiation of the ultraviolet beams.

14. A manufacturing process according to claim 6, wherein the molding process is a spinning process and the organic silazane polymer is melted and spun to obtain ceramic fibers.

15. A manufacturing process according to claim 6, wherein the sintering temperature is from 700° to 2000° C.

16. A manufacturing process according to claim 6, wherein the sintering atmosphere is vacuum or at least one gas selected from the group consisting of inert gases, $N_2$, $H_2$ and $NH_3$ gases.

17. A manufacturing process according to claim 6, wherein the organic silazane polymer is added to a powder of inorganic compound as a binding agent and sintered.

18. A manufacturing process according to claim 17, wherein the powder of inorganic compound is at least one material selected from the group consisting of alumina, silicon carbide, silicon nitride and boron nitride.

19. An organic silazane polymer produced by the process of anyone of claims 1 through 5.

20. The organic silazane polymer of claim 19 having a melting point from 60° to 250° C. and a molecular weight of from 800 to 3,000.

21. A ceramic article formed by the process of anyone of claims 6 through 13.

22. The ceramic article of claim 21 in the form of a sheet or fiber.

23. The ceramic article of claim 22 in the form of a fiber having a tensile strength from 230 to 310 kg/mm$^2$ and a modulus from 16 to 30 tons/mm$^2$.

* * * * *